US010875785B2

(12) United States Patent
Cort (10) Patent No.: US 10,875,785 B2
(45) Date of Patent: Dec. 29, 2020

(54) RECOVERY OF VALUABLE RESOURCES FROM PRODUCED WATER AND COAL COMBUSTION PRODUCTS (71) Applicant: Steven L. Cort, Cary, NC (US)

(72) Inventor: Steven L. Cort, Cary, NC (US)

(*) Notice: Subject to any disclaimer, the term of this patent is extended or adjusted under 35 U.S.C. 154(b) by 370 days.

(21) Appl. No.: 15/731,708

(22) Filed: Jul. 21, 2017

(65) Prior Publication Data
US 2018/0022617 A1   Jan. 25, 2018

Related U.S. Application Data (60) Provisional application No. 62/365,498, filed on Jul. 22, 2016.

(51) Int. Cl.
| | |
|---|---|
| C01G 49/00 | (2006.01) |
| C01F 11/46 | (2006.01) |
| C01F 13/00 | (2006.01) |
| C01F 11/18 | (2006.01) |
| C01C 1/16 | (2006.01) |
| C01D 7/00 | (2006.01) |
| C02F 9/00 | (2006.01) |
| B01D 53/60 | (2006.01) |
| B01D 53/64 | (2006.01) |
| B01D 53/62 | (2006.01) |
| B01D 17/02 | (2006.01) |
| C01F 5/24 | (2006.01) |
| B01D 1/00 | (2006.01) |
| C02F 1/24 | (2006.01) |
| C02F 1/04 | (2006.01) |
| C02F 1/14 | (2006.01) |
| C02F 1/52 | (2006.01) |
| C02F 103/10 | (2006.01) |
| C02F 101/32 | (2006.01) |
| C02F 101/10 | (2006.01) |
| C02F 1/28 | (2006.01) |
| C02F 101/20 | (2006.01) |
| C02F 103/36 | (2006.01) |

(52) U.S. Cl.
CPC ......... *C01G 49/009* (2013.01); *B01D 1/0035* (2013.01); *B01D 17/0205* (2013.01); *B01D 17/0214* (2013.01); *B01D 53/60* (2013.01); *B01D 53/62* (2013.01); *B01D 53/64* (2013.01); *C01C 1/164* (2013.01); *C01D 7/00* (2013.01); *C01F 5/24* (2013.01); *C01F 11/18* (2013.01); *C01F 11/181* (2013.01); *C01F 11/187* (2013.01); *C01F 11/462* (2013.01); *C01F 13/00* (2013.01); *C01G 49/00* (2013.01); *C02F 9/00* (2013.01); *B01D 2251/206* (2013.01); *B01D 2251/304* (2013.01); *B01D 2251/606* (2013.01); *B01D 2257/504* (2013.01); *B01D 2257/602* (2013.01); *B01D 2258/0283* (2013.01); *C02F 1/048* (2013.01); *C02F 1/14* (2013.01); *C02F 1/24* (2013.01); *C02F 1/281* (2013.01); *C02F 1/283* (2013.01); *C02F 1/5236* (2013.01); *C02F 2001/5218* (2013.01); *C02F 2101/101* (2013.01); *C02F 2101/20* (2013.01); *C02F 2101/32* (2013.01); *C02F 2103/10* (2013.01); *C02F 2103/365* (2013.01); *C02F 2301/08* (2013.01); *Y02A 20/212* (2018.01); *Y02C 20/40* (2020.08); *Y02P 20/129* (2015.11); *Y02P 20/133* (2015.11); *Y02W 10/37* (2015.05)

(58) Field of Classification Search
CPC ....... C01F 11/18; C01F 11/187; C01F 11/181; C01F 11/462; C01F 5/24; C01F 13/00; C01G 49/00; C01C 1/164; C01D 7/10; C01D 7/00; C02F 9/00; B01D 53/60; B01D 53/62; B01D 53/64; B01D 17/0205; B01D 17/0214; B01D 1/0035
See application file for complete search history.

(56) References Cited

U.S. PATENT DOCUMENTS

| | | | | | |
|---|---|---|---|---|---|
| 4,563,340 | A | * | 1/1986 | Polendo-Loredo | ...... C01D 7/18 23/302 T |
| 6,419,887 | B1 | * | 7/2002 | Cabello-Fuentes | ..... C01C 1/185 423/199 |
| 2017/0341942 | A1 | * | 11/2017 | Harper, Jr. | ............. C12M 21/04 |

FOREIGN PATENT DOCUMENTS

WO   2007-139392   * 12/2007

OTHER PUBLICATIONS

Nunes et al, "Treatment of oilfield produced water . . . (soda ash)" Brazilian Journal of Petroleum and Gas, vol. 7, No. 1, pp. 31-41, 2013. (Year: 2013).*

* cited by examiner

Primary Examiner — Steven J Bos
(74) Attorney, Agent, or Firm — Michaelde Angeli (57) ABSTRACT The present invention relates to processes employing water produced from wells that, after suitable purification steps, is processed to recover resources that can be used to treat other waste streams, such as flue gases and ashes from combustion of fossil fuels.

8 Claims, 5 Drawing Sheets

Figure 1
(SSP)

Figure 2
(CP - Debang)

Figure 3
(CP - Solvay)

Figure 4
(FGE Treatment)

Figure 5 (Ash Resource Recovery System)

RECOVERY OF VALUABLE RESOURCES FROM PRODUCED WATER AND COAL COMBUSTION PRODUCTS

CROSS-REFERENCE TO RELATED APPLICATION

This application claims priority from provisional application Ser. No. 62/365,498, filed Jul. 22, 2016.

FIELD OF THE INVENTION

The present invention relates to the process of recovering valuable resources from wastes generated by oil, gas, coal and other mining operations and from coal combustion products, and describes a manner in which the recovery of these resources can be made profitable and can be used to clean up other waste products from other mining activities.

BACKGROUND OF THE INVENTION

There are a number of waste streams produced from the oil, gas, coal, and mineral mining industries (collectively referred to as Mining Industries) as well as from coal combustion that causes significant harm to the environment. The five most pressing environmental problems facing the Mining Industries are; (1) Produced and flow back water from drilling for oil and gas (hereinafter called Production Water (PW)), including flow back water from "fracking" operations; (2) Coal Waste from coal mining (hereinafter called GOB): (3) Acid Mine Drainage discharged from sulfidic waste materials (hereinafter called AMD); (4) Flue Gas Emissions (hereinafter called FGE); and (5) Coal Combustion Products that include fly ash, bottom ash, and solid materials produced from the treatment of gaseous products resulting from the combustion of coal (hereinafter called CCP). Up until now, treating these waste streams has been expensive and certainly not profitable, so not enough progress has been made in solving these major environmental problems.

Specifically, drilling for oil and gas results in large quantities of PW. Each year, approximately 20 to 30 billion barrels of PW are generated by oil and gas production operations in the U.S. This is some 70 times the amount of all liquid hazardous wastes generated in the U.S. PW ranges in salinity from a few thousand to 463,000 ppm total dissolved solids (TDS) and is very costly to desalinate. During the life of a typical oil well, each barrel of oil produced generates on average eight barrels of PW that must be treated.

Large amounts of specially treated water are used to fracture ("frack") the soil around a well to allow the efficient flow of oil or gas to the surface. A single well may require between 2-8 million gallons of fracking water and after fracking, anywhere from 40-90% may flow back (called Flow Back Water) to the surface, requiring treatment.

Both Produced Water and Flow Back Water (collectively PW) contain oil, heavy metals, and inorganic salts (monovalent and divalent) and after some level of treatment, are either reused in further fracking operations or disposed of in underground saltwater injection wells. Unless the inorganic salts are removed through desalination, these wastewaters are not suitable for direct discharge or for use for livestock watering or irrigation.

The majority of inorganic salts contained in PW are usually soluble chlorides, primarily NaCl, which can be removed from solution by desalination by the use of reverse osmosis (RO) membranes, ion exchange, or thermal distillation. However, each of these three options has high capital and operating costs and is not usually economically feasible. Furthermore, in cases of high salt content, RO membrane use is not possible. Therefore the major problem with PW is the sodium chloride (NaCl) and the cost of removing it so PW can be reused or discharged. The only economic solution as described in this patent application is to convert the NaCl into other more valuable chemicals.

It is known in the art that Nacl can be converted into soda ash and calcium chloride. In the 1840's Ernest Solvay developed a method for producing sodium carbonate ($Na_2CO_3$, or soda ash, which is useful in making glass, and for other uses) from carbon dioxide and NaCl, using limestone and ammonia. However, calcium chloride is a byproduct that had little value and was considered to be a waste product.

In the 1930s, a Chinese chemist named Hou Debang developed a modification to the known Solvay process. Debang modified the Solvay process to produce ammonium chloride, a valuable fertilizer, rather than calcium chloride, a waste product. Thus NaCl, considered the major problem chemical in PW, itself has little value, but is used in the Debang or Solvay process (hereinafter collectively referred to as the Conversion Process, or CP) to produce other valuable chemicals.

Briefly, the CP, in the Debang version, reacts sodium chloride (NaCl) with ammonia ($NH_3$), carbon dioxide ($CO_2$), and water to produce ammonium chloride ($NH_4Cl$), which has many uses as discussed below, and sodium bicarbonate ($NaHCO_3$), which upon heating produces sodium carbonate ($Na_2CO_3$) for use in many industrial processes, and carbon dioxide, which can be recycled back into the CP.

A major improvement of the Debang process over the Solvay process is that it eliminates the production of calcium chloride, which is a low value product and instead produces ammonium chloride that can be used as a high valued fertilizer or can be used to lower mercury emissions from coal fired power plants. Because of its simplicity, the Debang Process is the most common production method in the world for converting sodium chloride into ammonium chloride and sodium bicarbonate. However, there are new uses for calcium chloride, for example in road deicing and dust control, so the Solvay process remains an important CP for the conversion of NaCl into soda ash.

Therefore one skilled in the art could make the connection that because PW contains sodium chloride, this could possibly converted into soda ash and calcium chloride. This was proven in a paper written by Nunes, S. K. S., et. al., in a paper published in the Brazilian Journal of Petroleum and Gas, V.7 n.1, p. 031-041 (2013), titled TREATMENT OF OILFIELD PRODUCED WATER: A CLEANER PROCESS FOR PRODUCING SODIUM CARBONATE (SODA ASH). This research evaluated a process for using an anionic surfactant to float out dispersed oil and sodium carbonate was employed to promote calcium and magnesium precipitations. This patent application differs from the Nunes work in several significant ways. First the Nunes work only focused on the removal of calcium and magnesium. These elements are not of concern to this patent application because the end uses of the products produced from the Solvay process to treat environmental problems are only concerned with heavy metals, particularly barium, radium, and strontium. None of these elements are mentioned in the Nunes work and the only way to remove these elements economically from PW is the SSP process claimed in this patent application. Second, there is no mention in the Nunes work that the sodium carbonate comes from the Solvay process. This is not obvious and differentiates this patent application from the Nunes work. Third there is no mention in the Nunes work that the products from the Solvay process are used to solve specific environmental problems like the treatment of AMD or the treatment of FGE. The calcium chloride produced by the Solvay process can be used to precipitate sulfate from AMD to produce gypsum, and the calcium chloride will enhance the removal of mercury from FGE. Soda ash can be used to remove sulfur dioxide, carbon dioxide, and nitrogen oxides from FGE, and soda ash can be used to neutralize AMD. In addition, when these environmental problems are solved according to the invention, the recovered resources such as sodium sulfate can be used to precipitate barium, strontium, and radium from PW, and sodium carbonate from the treatment of FGE can be used to precipitate heavy metals from PW. In summary, while the Nunes work describes the possibility of using one process to use PW to produce soda ash, it fails to follow the SSP process described in this patent application. The Nunes work also fails to suggest the use of the Solvay products to treat certain environmental problems and fails to use products from the Solvay process to pretreat the PW prior to the Solvay process. It also fails to show how certain chemical compounds recovered from the treatment of AMD and FGE can be used in the treatment of PW.

The mining of coal and its combustion produce large quantities of solid, liquid, and gaseous wastes. Coal produces large quantities of fly and bottom ash when burned. Historically, most fly ash produced is used as an additive for cement, however large quantities, estimated to be over 50 million tons of ash, are stockpiled each year.

Coal also contains other elements such as sulfur, carbon, nitrogen, and mercury that when burned result in toxic FGE. Flue gas scrubbing systems are necessary to remove these gaseous emissions to meet present and future regulatory limits. These flue gas scrubbing systems produce large quantities of solid waste that must be stored, and when reused mostly goes to produce wallboard or goes into agriculture applications. Considerable expense is incurred in the removal of FGE from the combustion fossil fuels but there is value in FGE that can be used for treating wastewater, as discussed below.

Fly ash produced from coal combustion has the most value. The full value of this ash has been documented but has not been fully realized commercially. To date, the major use of fly ash (approximately 40%) has been as an additive to cement; however, before it is suitable for this application, the amount of unburned carbon contained in the fly ash must be lowered to below about 4%.

Presently, because of technologies employed to reduce NOx emissions from coal combustion, the amount of unburned carbon in fly ash has increased to above this 4% approximate level, which reduces its suitability for cement application unless the unburned carbon is removed. While the cement application uses the greatest amount of fly ash, it is not a high value use and fly ash in this market is worth only about $20-30 per ton.

There is far more value in other resources contained in coal ash, especially products useful in water treatment applications. The unburned carbon, which can range from 8-20% in fly ash, can be processed into a suitable activated carbon that is valued between $400-$1500 per ton and can be used to treat water and FGE. Fly ash is mostly made up of aluminum and silicon, which are the main ingredients in zeolites, a valuable industrial chemical with many uses, especially as an adsorbent. A percentage (1-2%) of the iron contained is magnetite, which is used to clean fine coal in heavy media washers and has significant applications in clarifying and treating water and as a raw material in the production of magnetic adsorbents. These three recovered resources are important products that make fly ash worth approximately five to ten times the value of fly ash when used as a cement additive.

The amount of aluminum in fly ash ranges between 5-10% and aluminum metal is valued at over $1600 per ton. Therefore the value of aluminum recoverable from fly ash is about $125/ton of fly ash.

There is data that shows that coal fly ash from certain regions like central and southern Appalachia contains significant amounts of rare earth elements that can be worth as much as $4000 per ton of fly ash.

The storage of CCP has negative environmental impacts. CCP contains toxic materials, which include organics and heavy metals like chromium, copper, zinc, nickel, arsenic, selenium, thallium, and others. When water impoundments containing CCP are not lined, these metal pollutants leach into the groundwater and are often discharged without treatment causing heavy metals to enter surface waters. Finally, dried ash causes a problem with fugitive dust affecting the health of local workers and residents.

In order to make environmental cleanup affordable for the Mining Industries, this patent application shows how resources can be recovered from waste products and then converted into more valuable resources that can be used to treat wastewater and FGE from the Mining Industries.

Prior to this invention, recovering the full value of the resources contained in PW, CCP, GOB, FGE, and AMD has been elusive because there had been no disclosure of a method whereby these wastes could be economically turned into valuable products that can be used to treat other mining wastes, especially AMD and FGE.

For example, as disclosed in this application, using the known Debang process, chemicals in PW can be converted into ammonium chloride, which can be used as agricultural fertilizer and as an industrial chemical that can remove sulfur dioxide, nitrogen dioxide, and carbon dioxide from coal flue gas, and can oxidize mercury in FGE to improve removal efficiencies.

Another aspect of the invention is based on the fact that coal ash contains many constituents, specifically, magnetite, zeolite, and unburned carbon that if separated effectively can be used to clean wastewater from the Mining Industries. All three of these products are effective adsorbents and can be even more valuable when converted into magnetic adsorbents.

Another important aspect of the invention is the combustion of GOB that can be burned to produce electricity and generate waste heat. The electricity and waste heat can be used to concentrate PW so this waste is suitable for the CP (detailed below) to convert PW from a waste into a resource that has significant value and can treat other waste problems such as AMD and FGE.

AMD is a major problem for the Mining Industries. Acidic water produced by the oxidation of sulfide contained in solid wastes from the Mining Industries into sulfate causes heavy metals to leach from the solid waste and discharge into the environment. Because of low chemical cost, lime treatment is commonly performed, whereby the AMD is neutralized and the heavy metals contained in AMD precipitated out. However, this approach results in a great amount of gypsum sludge being produced and therefore only manages to change a water quality problem into a solid waste problem. Depending on the source of the AMD, it usually contains large amounts of valuable metals that if they can be separated into pure products, can produce enough revenue to pay for the treatment of AMD and in some cases produce a significant profit.

Treating these waste streams and recovering resources is mainly a water treatment process. To recover these resources in sufficiently pure quality so they have economic value requires performing the water treatment process in a series of steps. This application discloses and claims a Sequential Separation Process (SSP), which can be used to economically recover these valuable resources contained in PW. A separate application will be filed disclosing an SSP that is effective in recovering resources in AMD and cleaning up the water in AMD.

BRIEF SUMMARY OF THE INVENTION

Aside from the preferred embodiment or embodiments disclosed below, this invention is capable of other embodiments and of being practiced or being carried out in various ways. Thus, it is to be understood that this invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

It is therefore an objective of this invention to provide a novel system and method for enhancing the conversion of waste materials from the Mining Industries, including coal combustion as noted above, into usable products that improve the value of different waste streams in their respective industries and to produce water treatment products that can be used to treat other waste streams in these and other industries.

Furthermore, it is an objective of this invention to use sodium chloride (NaCl) preferably derived from PW, and carbon dioxide ($CO_2$) preferably derived from the combustion of fossil fuels and more preferably derived from the combustion of GOB and culm, and liquid ammonia ($NH_3$) preferably derived from coal or natural gas and used according to the Solvay, Debang or any closely related conversion process (hereinafter referred to as the CP) that converts NaCl into more valuable new products that can be used to treat other waste streams in the Mining Industries, including but not limited to AMD, CCP, GOB, FGE, and PW.

Furthermore, it is an objective of this invention to combine specific technologies in a unique and novel way to create a total system that makes it possible to not only recover valuable resources from each waste stream in the Mining Industries in a pure form for economic benefit, but to arrange these technologies is such a way that the produced resources from each waste stream are beneficial in the treatment of another waste stream in the Mining Industries.

Furthermore, it is an objective of this invention to use the CP to convert PW from oil and gas drilling operations into usable products such as sodium bicarbonate, calcium chloride, and ammonium chloride.

Furthermore, it is an objective of this invention to use the sodium bicarbonate, which can also be converted to sodium carbonate with heat, from the CP to effectively remove sulfur dioxide and carbon dioxide from coal combustion flue gas.

Furthermore, it is an objective of this invention to use ammonium chloride produced by the CP from PW for the treatment of mercury in flue gas by oxidizing mercury with the chlorine and treating nitrogen dioxide emissions with the ammonia.

Furthermore, it is an objective of this invention to use sodium bicarbonate and sodium sulfate produced from the treatment of coal flue gas to remove divalent cations from PW, and to provide carbon dioxide for the CP.

Furthermore, it is an objective of this invention to recover water treatment chemicals from CCP and to pretreat PW with sodium bicarbonate recovered from the removal of carbon dioxide from coal flue gas.

Furthermore, it is an objective of this invention to recover and modify chemical compounds (unburned carbon, zeolites, gypsum, and magnetite) removed from CCP to produce adsorbents and specifically magnetic adsorbents that can be used specifically to pretreat PW before the CP as well as for removing other toxic organics from other wastewaters.

Furthermore, it is an objective of this invention to use hydrodynamic cavitation to micronize lime and other products used in water treatment in order to reduce the particle size, which will increase their reactivity. Specifically, hydrodynamic cavitation can be used to de-armor coated lime used in the treatment of AMD or to micronize lime so it is more reactive for improved utilization.

Furthermore, it is an objective of this invention to use aluminum and calcium recovered from CCP to precipitate ettringite (calcium aluminum sulfate), which will lower sulfate levels contained in AMD to achieve allowable discharge limits.

Furthermore, it is an objective of this invention to combine the technologies of: pretreatment with SSP (before the CP), the CP, and CCP resource recovery to treat PW, AMD, and coal flue gas.

Furthermore, it is an objective of this invention to practice SSP, which includes: oil/water separation first, then evaporation to concentrate sodium chloride, then sulfate treatment to remove barium and radium, and then carbonate treatment to remove divalent metal carbonates, in order to provide a concentrated NaCl brine for supply to the CP.

Furthermore, it is an objective of this invention to use magnetite from CCP, more specifically, from coal fly ash, to clean fine coal and fine waste coal in heavy media washers.

Furthermore, it is an objective of this invention to use iron removed from AMD and other waste streams from the Mining Industries in the production of synthetic magnetite using caustic produced from clean sodium chloride necessary for the CP or other sources to be used in the production of magnetic adsorbents.

Furthermore, it is an objective of this invention to heat soda ash ($NaHCO_3$) from the CP to form sodium carbonate ($Na_2CO_3$), and then to react this with calcium hydroxide $Ca(OH)_2$ from a lime kiln to produce limestone ($CaCO_3$), which is reused back in the lime kiln, and sodium hydroxide (NaOH), a valuable industrial chemical, according to the following reactions:

$$2NaHCO_3 + heat = Na_2CO_3 + CO_2 + H_2O$$

$$Na_2CO_3 + Ca(OH)_2 = CaCO_3 + 2NaOH$$

Furthermore, it is an objective of this invention to use waste heat from the coal-burning plant to recover carbon dioxide from sodium bicarbonate to fuel the CP for treating PW. Waste heat can also be used to concentrate NaCl for the CP.

Furthermore, it is an objective of this invention to use a salinity gradient solar pond (SGSP) to concentrate the salts in PW so it is suitable for the CP and to produce a dilute water source for membrane distillation. It is also an objective to use freeze-thaw technology to concentrate PW in cold climates.

Furthermore, it is an objective of this invention to use microbubbles with atomization (fogging) of PW to concentrate NaCl for the CP.

Furthermore, it is an objective of this invention to use waste heat from fuel combustion combined with microbubbles to enhance evaporation of PW.

Furthermore, it is an objective of this invention to use calcium and sodium sulfate produced by the treatment of flue gas to remove sulfur dioxide to react with barium and radium in PW.

Furthermore, it is an objective of this invention to recover water treatment resources contained in CCP sequentially to separately remove magnetite either by gravity or magnetically, remove unburned carbon either by froth flotation, air separation, or electrostatically, remove cenospheres (hollow alumino-silicate glass beads) by air or water flotation, and remove aluminum either as a source for metal production or as a zeolite that is either natural or can be chemically treated to form synthetic zeolite.

Furthermore, it is an objective of this invention to use hydrodynamic cavitation to soften, disinfect, and produce microbubbles for the treatment of PW prior to the CP.

Furthermore, it is an objective of this invention to use Coal GOB and PW and the resources contained therein in combination to eliminate the environmental problems associated with CCP, AMD, Coal GOB, and PW.

Furthermore, it is an objective of this invention to use ammonium chloride produced from the CP to treat mercury contained in FGE.

Frack water from the oil/gas industry contains many toxic waste products, such as oil, heavy metals, and inorganic salts that make the reuse and disposal of this wastewater expensive and difficult. While the oil, heavy metals, and sparingly soluble salts can be removed by precipitation and separation, it is the soluble salt, sodium chloride, NaCl that is the principal problem. NaCl can be removed by expensive technologies such as reverse osmosis (RO) across a membrane, ion exchange, or thermal distillation, but a more cost effective approach is to convert the NaCl into valuable resource chemicals.

This invention describes a novel way to use proven technologies to recover valuable resources from waste streams found in the Mining Industries (coal, oil/gas, and mineral mining), which may be used to treat other waste streams in the Mining Industries, and for other uses. It is to be appreciated that the process described in this application, while representative of an optimum arrangement, is not the only arrangement of selected treatment technologies.

Of special importance is the use of the CP, or modification thereof to produce sodium bicarbonate and ammonium chloride from a concentrated pure source of sodium chloride derived from PW originating from oil and gas wells that have been treated to remove other contaminants in a sequential way as described by the SSP. The produced sodium carbonate can be used to treat other waste streams found in mining for oil, gas, coal, and other minerals.

PW normally contains varying amounts of free floating, emulsified and dissolved levels of oil. The first step of the SSP according to the invention is to remove the free floating and most of the emulsified oil. This can be done by standard oil/water separation methods. However, the preferred method for removing this oil from the PW Is the use of a combination of microbubbles and coarse bubbles with a flocculating polymer to float oil out of the PW.

The next step of the SSP is to remove unwanted contaminants that will affect the treatment process and contaminate the end products. PW contains several contaminants that will affect the quality of the recovered resources. For example, barium and radium have no real value in the CP and since barium is a hazardous metal and radium is radioactive these chemicals must be removed separately before the CP. Barium and radium are removed as either sulfate or carbonate precipitates, preferably as sulfates. The resulting product of barium/radium sulfate may be used, e.g., as a weighting agent in a drilling operation. The source of the sulfur or carbonates comes from the treatment of flue gas.

The next step of SSP is removal of the divalent carbonates. This includes predominantly the carbonates of iron, calcium, magnesium and strontium. While these carbonates may not cause a significant problem in the process, it is preferred that they are removed at this stage of the process because they have use in the treatment of AMD, and in other industries, and may interfere with the final use of the Debang or Solvay processes to produce ammonium chloride, calcium chloride, and sodium bicarbonate.

Treatment of PW for reuse in fracking operations or for reuse in other applications like water flooding to enhance oil recovery requires softening to reduce scaling, removal of heavy metals especially iron, disinfection to kill sulfur-reducing bacteria, degassing to remove volatile organic carbons, neutralization of hydrogen sulfide, and oxidation of heavy metals as well as other treatment operations required by the operator.

Hydrodynamic cavitation can be performed to produce microbubbles of oxygen. This is effective in oxidizing heavy metals especially iron and oxidizing hydrogen sulfide to produce a sulfate.

Collapsing bubbles caused by hydrodynamic cavitation has a degassing effect on PW that is effective in removing dissolved oxygen, carbon dioxide, volatile organic carbons (VOC) and hydrogen sulfide.

Hydrodynamic cavitation has proven to be effective in treating cooling water in evaporative cooling towers by reducing the scaling potential of the cooling water and disinfecting the cooling water by the production of hydroxyl radicals. More particularly, the main scaling divalent cation in PW is calcium and hydrodynamic cavitation converts calcium from a calcite form into calcium in an aragonite form. Calcite calcium is highly scaling while aragonite calcium is not. This effect on calcium also causes other cations like magnesium and other chemicals like silica to co-precipitate so they can be easily removed by clarification.

The formation of hydroxyl radicals and the extreme conditions of temperature and pressure found in hydrodynamic cavitation are effective in killing sulfur reducing bacteria. This dual effect of softening and disinfection has not been used on PW insofar as known to the inventor.

The above pretreatment steps of the SSP are to produce a relatively clean concentrated solution of sodium chloride for the CP.

After the above SSP pretreatment process, it is important to concentrate the level of sodium chloride in the brine used for the CP. The level of sodium chloride should be above 150,000 ppm. This is necessary to reduce the size of the following treatment systems and to drive the reaction of sodium chloride and ammonia to sodium bicarbonate and ammonium chloride by the CP.

The proposed methods to concentrate sodium chloride in the brine for the CP are a salinity gradient solar pond (SGSP), the use of microbubbles atomized into the air to promote evaporation, thermal evaporation using waste heat from the combustion of fossil fuels in combination with microbubbles, and combinations of these. Each method has its advantages based on available land, cost, climate, or the availability of waste heat.

The CP, in the Debang embodiment, adds ammonia and carbon dioxide to react with concentrated sodium chloride to form ammonium chloride and sodium bicarbonate. Ammonium chloride can be concentrated by cooling to form a solid used as fertilizer or in the treatment of flue gas to remove mercury, and the sodium bicarbonate can be heated to liberate carbon dioxide for reuse in the CP and to produce sodium carbonate that can be used to remove sulfur dioxide and to remove and sequester carbon dioxide from the combustion of GOB or other carbonaceous materials.

The ammonia and carbon dioxide used by the CP to convert sodium chloride into ammonium chloride and sodium bicarbonate can be synthesized from the combustion of waste coal or other solid carbon materials. Passing steam over hot carbon produces a mixture of hydrogen and carbon dioxide gases. Hydrogen is the basis for ammonia production using the water gas reaction followed by the water gas shift reaction. Washing the gas mixture with water under pressure separates the carbon dioxide. Therefore coal waste is an economical source of raw materials used by the CP to convert PW into other valuable industrial chemicals.

This invention also shows in detail how sodium bicarbonate and sodium carbonate can be used to treat gaseous emissions from the combustion of fossil fuels. In a first stage of flue gas treatment, sodium bicarbonate reacts with sulfur dioxide to produce sodium sulfate at high temperatures. The high temperature causes a "popcorn effect" on the sodium bicarbonate causing it to have increased surface area and therefore be more reactive with the sulfur dioxide. In this reaction, the sodium sulfate is removed with the CCP and carbon dioxide is liberated into the flue gas. The sodium sulfate can be used to precipitate barium and radium in the pretreatment of PW.

In a second step, sodium carbonate is added to the flue gas and reacts with the carbon dioxide produced from the first stage and the carbon dioxide from the combustion of the fossil fuel to produce sodium bicarbonate. The sodium bicarbonate collected and removed from the flue gas can be calcined (heated) to produce sodium carbonate and carbon dioxide that is reused in the CP. Ash collected from the combustion of GOB or any other carbon-based fuel is then treated in an ash resource recovery system. This system can also be used to process coal ash that is returned from utility plants in the coal cars that delivered the coal to the utility plant.

Burning fossil fuels like coal creates significant environmental problems such as production of CCP, which must be stored or further processed, and the discharge of FGE. These problems are difficult to solve because of economics and lack of suitable treatment technologies. This invention proposes methods to recover the resources from CCP and PW to treat FGE.

Coal contains many solid and gaseous contaminants. The predominant contaminant in CCP is heavy metals, which when stored in wet storage impoundments leach into the environment through surface and ground water. The burning of coal releases flue gases, which must be prevented from going into the environment. The main contaminants in flue gas are carbon dioxide, nitrogen oxides, sulfur dioxide, organics, and mercury.

Burning coal also produces ash, which has some uses, but which preferably would be processed in an ash resource recovery system to separate valuable resources for reuse in the total treatment system outlined in this patent application and to remove unwanted contaminants that prevent the reuse of the recovered resources.

The resources removed from the ash resource recovery system that are reused in the total treatment system are (1) sulfates, preferably removed from the combustion of GOB and used to precipitate barium and radium contained in PW, (2) unburned carbon, which can be activated for use, and (3) magnetite used to clarify PW in the pretreatment process of the CP and as heavy media in the washing of GOB, and, if necessary, as water treatment adsorbents to treat water before reuse or discharge.

The water treatment resources removed from the ash resource recovery system have significant value in not only reducing the cost of treating PW, AMD, and emissions from the burning of GOB but they have other valuable uses outside the Mining Industries.

Coal fly ash contains unburned carbon that has to be removed for the ash to be suitable for use as a cement additive. This unburned carbon can be activated by standard methods to increase its adsorption capacity. This activated carbon can be used to adsorb contaminants from the burning of GOB or can remove contaminants from water. The value of activated carbon ranges from $400 per ton to $1500 per ton for specialty activated carbon capable of adsorbing mercury from flue gas.

Zeolites contained in ash are alumino-silicates that have valuable adsorption properties for industrial use. Zeolites can also be used to treat wastewater and gaseous emissions from the treatment process outlined in this invention.

The value of magnetite contained in ash has been described above, but it is also to be noted that magnetite can also be converted into a magnetic adsorbent that is effective in treating water because it can be attached to contaminants and then easily removed from water using magnetic techniques.

Ash also contains large quantities of aluminum that can be recovered economically. Presently most of the bauxite used to produce aluminum is imported and the amount of aluminum contained in coal ash if recovered could reduce or eliminate the importation of bauxite.

There are other high valued resources such as rare earth elements contained in ash at levels comparable to the amount of rare earth elements contained in mined ores.

Thus, the main resources contained in these waste products from the Mining Industries that can be used in water treatment are unburned carbon, which can easily be converted into activated carbon, zeolites, which are a valuable alumino-silicate that has significant adsorptive value, and magnetite, which can be used in high rate clarification or as a magnetic adsorbent.

There are opportunities to use magnetite to clarify PW as pretreatment to the CP and also to use magnetite in heavy media washing of GOB.

In summary, this invention shows how the CP converts sodium chloride solution, liquid ammonia, and carbon dioxide into valuable byproducts for sale or reuse in this invention. The carbon dioxide comes from the conversion of sodium bicarbonate to sodium carbonate and from the combustion of GOB (or other carbon based fuels). Therefore, the only added chemical is ammonia, which preferably can come from natural gas or coal sources.

The described treatment process includes but is not limited to (1) a pretreatment system to produce a clean sodium chloride solution for the CP, (2) the CP to convert sodium chloride to ammonium chloride and sodium bicarbonate, (3) a waste fuel combustion system that uses GOB to produce electricity, waste heat, and chemicals (carbon dioxide, ammonia, and sulfate) to be used to treat PW, and the FGE from which is also treated with resources recovered from PW and (4) an ash resource recovery system that produces chemicals to treat water and emissions from fuel combustion and magnetite to clean GOB by heavy media washing.

The combination of the technologies described in this invention makes it possible to clean up four significant waste problems encountered in the Mining Industries (PW, AMD, CCP, and GOB) economically to produce valuable byproducts such as: activated carbon, magnetite, zeolites, divalent carbonates, aluminum metal, ammonium chloride, liquid carbon dioxide, rare earth elements, clean fill, electricity, waste heat, drilling fluid weighting agents, soda ash, and clean water for reuse. In summary, all of these four waste problems are solved by the use of resources found in and recovered from GOB and PW.

Another major environmental problem in the US and worldwide facing the Mining Industries is AMD. The mining of coal and heavy metal ore exposes metal sulfides contained in the mined products to the atmosphere, which oxidizes the sulfide to sulfate. This forms sulfuric acid that dissolves heavy metals contained in the mined wastes. Drainage from mine sites is therefore very acidic and contains large amounts of sulfate and heavy metals.

The present strategy to treat AMD is to neutralize it with limestone, which is a low cost solution, but which produces large quantities of sludge for disposal. An example is the plan for treatment of the AMD contained in the Berkeley pit, an abandoned copper mine in Butte, Mont. Water will be pumped from the pit and slaked lime will be added to precipitate the heavy metals and gypsum. These solids from AMD treatment will be separated by clarification and the solids disposed back into the pit. This plan simply transforms a water quality problem into a solid waste problem and does nothing to recover valuable resources from the AMD. There is significant concern that this approach will not lower sulfate levels in the clarified water to below permitted limits because of the partial solubility of gypsum. Thus, such treatment of AMD is expensive because of the cost of neutralizing chemicals and the cost of sludge handling and storage. There is also a lost economic value if the heavy metals are not recovered.

According to a related invention, which will be more specifically disclosed and claimed in another application, AMD is converted into a valuable resource by separately recovering heavy metals and sulfates (gypsum and ettringite) in forms that have economic value, and in order to produce clean water for discharge.

Recovering the heavy metals greatly reduces the amount of sludge for handling and storage. After the heavy metals are removed, the sulfates can be recovered and used for soil enhancements or industrial products like gypsum.

The combustion of GOB contributes to the economics of this invention because it uses a waste product that otherwise would require safe disposal, produces electricity, provides a source of carbon dioxide for the treatment of PW, produces waste heat that converts sodium bicarbonate to sodium carbonate used to treat flue gas, and to form divalent carbonates in the pretreatment of PW, which can be removed by precipitation. While GOB is the preferred fuel because it is itself a waste that causes environmental problems, any fossil fuel can be burned to replace GOB.

Treating sodium carbonate with calcium hydroxide produces sodium hydroxide and calcium carbonate. The calcium carbonate is easily separated because it is insoluble while sodium hydroxide is soluble. This reaction is as follows:

$$Ca(OH)_2(aq)+Na_2CO_3(s) \rightarrow CaCO_3+2NaOH(aq)$$

The production of sodium hydroxide (NaOH) by this method is important because of the high value of NaOH and because the two main reactants are available from waste products generated from the Mining Industries. Calcium is found in fly ash as well as in flue gas desulfurization (FGD) wastes generated from treatment of CCP. Sodium carbonate is a reaction product from the CP and according to this invention is used to treat PW from the oil/gas industry. Sodium hydroxide is a valuable industrial chemical with many uses and is especially useful in the neutralization of AMD because it does not produce gypsum when combined with sulfate. Using sodium hydroxide to neutralize AMD allows the cost effective recovery of concentrated metals. The pure source of sodium chloride necessary for the CP is also suitable for a membrane cell process for electrolytically separating sodium chloride into sodium hydroxide and hydrochloric acid.

Mitsubishi Heavy Industries (MHI) has developed an effective system for mercury removal from flue gases that is integrated with a Selective Catalytic Reductor (SCR) and a FGD system. The MHI technology uses the injection of ammonium chloride ($NH_4Cl$) into the ductwork, upstream of the SCR catalyst and provides NOx control and improved oxidation of elemental mercury. The downstream wet FGD effectively removes the sulfur dioxide and the oxidized mercury. Southern Company and MHI successfully completed a full-scale demonstration of this mercury removal system at Alabama Power's Plant Miller Unit 1 (700 MW) in April 2011, and have shown that using $NH_4Cl$ can result in much lower operating costs than activated carbon injection and reduces the use of hazardous anhydrous ammonia injection. This report shows over 90% total mercury removal performance using $NH_4Cl$. Rather than contaminate the FGD system with mercury, an intermediate scrubber that will react mercury with sulfide can be installed to produce a mercury sulfide precipitate that can be removed separately to prevent downstream mercury contamination.

In summary, according to the present invention, PW is first treated with sulfate to remove barium and radium sulfates, followed by treatment with sodium carbonate to remove divalent (calcium, magnesium, strontium, and iron) cations to produce relatively pure sodium chloride brine for the CP. In the CP, sodium chloride is reacted with ammonia and carbon dioxide to produce sodium bicarbonate and either calcium chloride or ammonium chloride. The sodium bicarbonate can be used to remove sulfur dioxide and carbon dioxide from flue gas. The ammonium chloride can be used to remove nitrogen dioxide and mercury from flue gas. Therefore the combination of PW and the addition of anhydrous ammonia will produce two chemicals that can remove carbon dioxide, sulfur dioxide, nitrogen dioxide, and mercury effectively from flue gas resulting from the burning of fossil fuels. The ammonia in ammonium chloride also reduces the amount of anhydrous ammonia used to remove nitrogen dioxide from flue gas.

The subject invention, however, in other embodiments, need not achieve all these functions described hereof and should not be limited to structures or methods capable of achieving each of these objectives.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Figure 1:
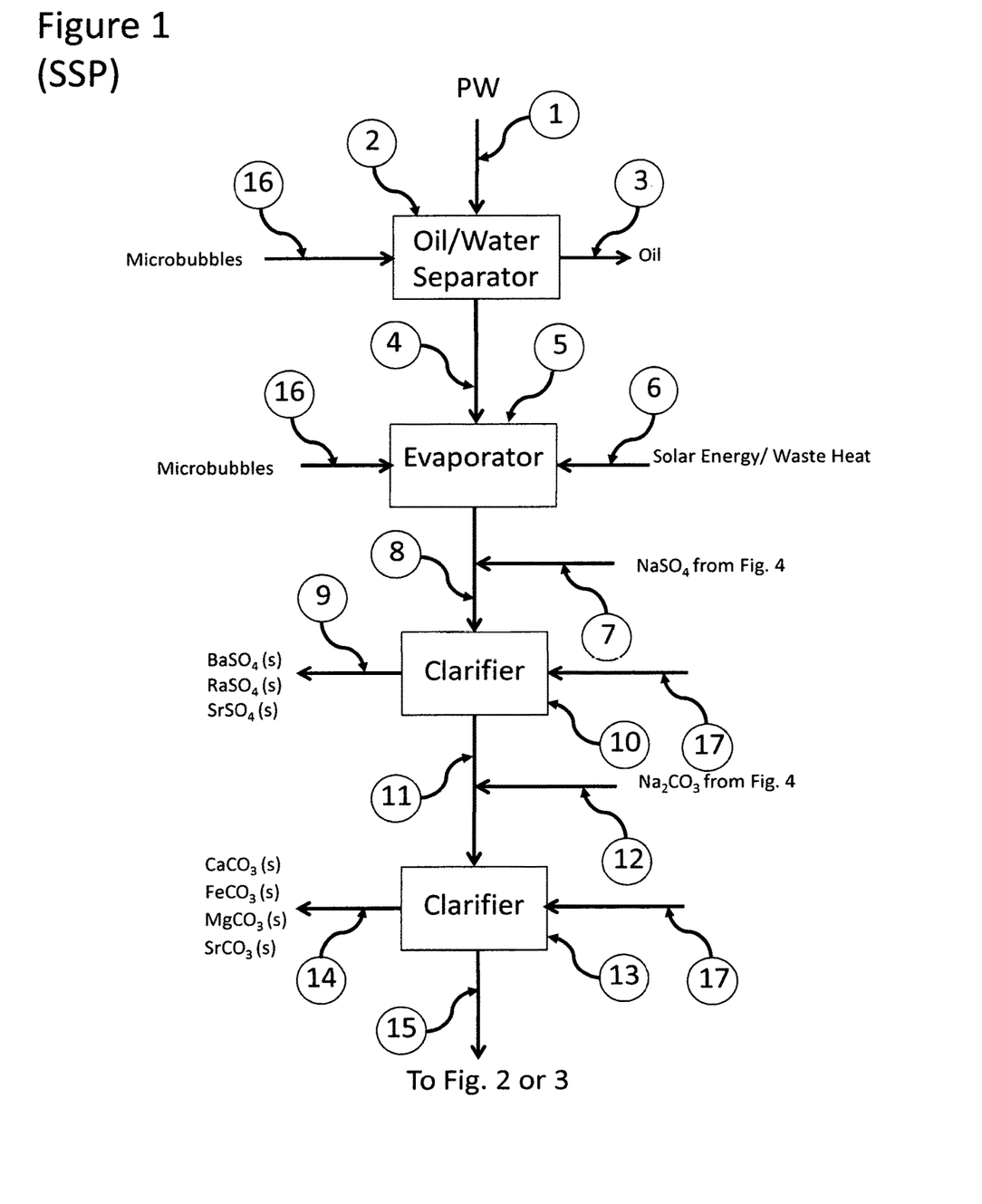
FIG. 1 is a schematic diagram of the SSP process used to pretreat PW prior to the CP process shown in FIGS. 2 and 3 below.

FIG. 1 shows a schematic diagram of the SSP process used to pretreat PW prior to the CPs shown in FIGS. 2 and 3 below. PW (1) flows into an oil water separator (2) that removes oil (3) and flows oil free PW (4) to an evaporator (5). The preferred method for removing oil from the PW is the use of a combination of microbubbles and coarse bubbles (16), preferably produced by hydrodynamic cavitation, with a flocculating polymer to float oil (3) out of the PW.

Figure 2:
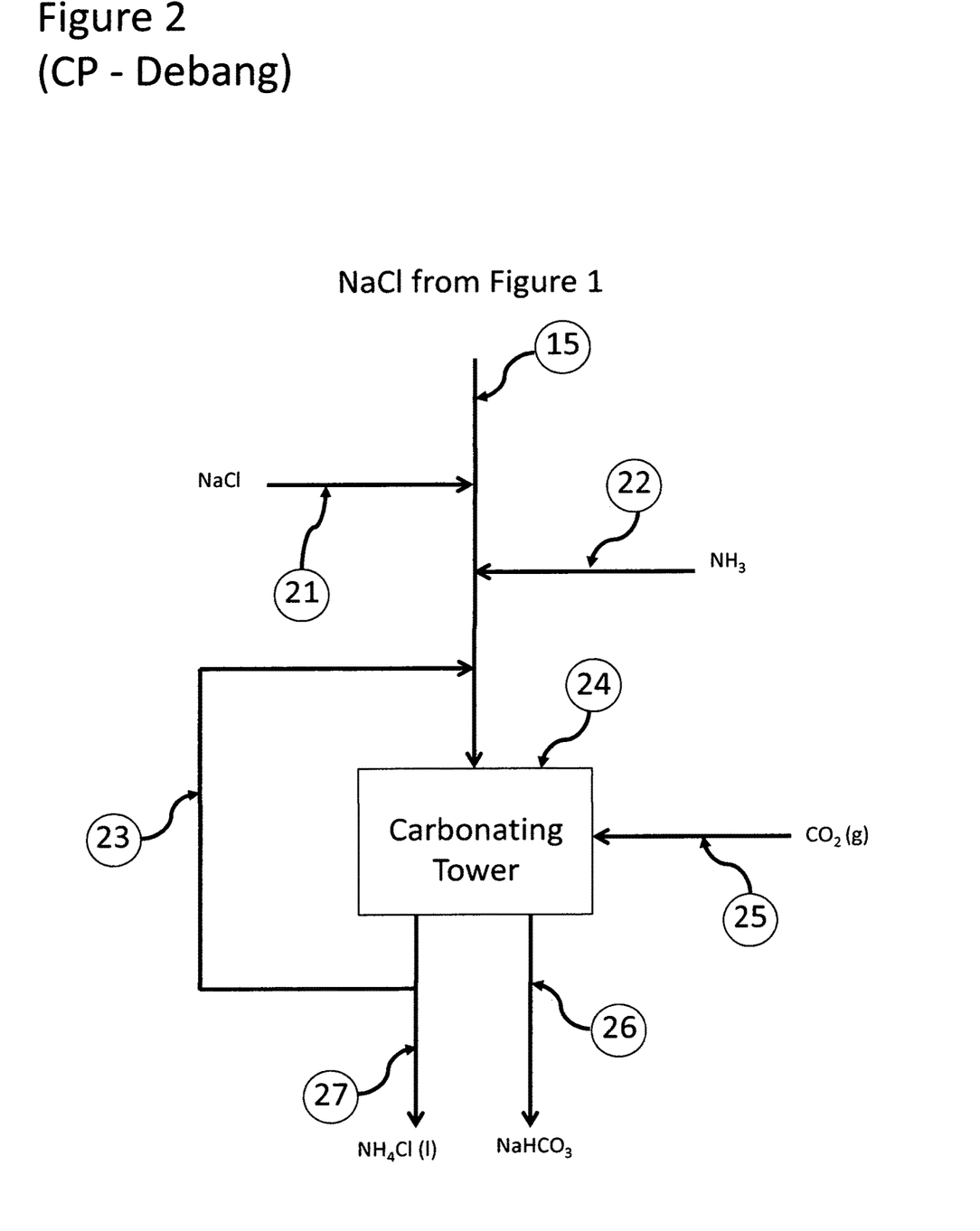
FIG. 2 is a schematic diagram of the Debang version of the CP.
Figure 3:
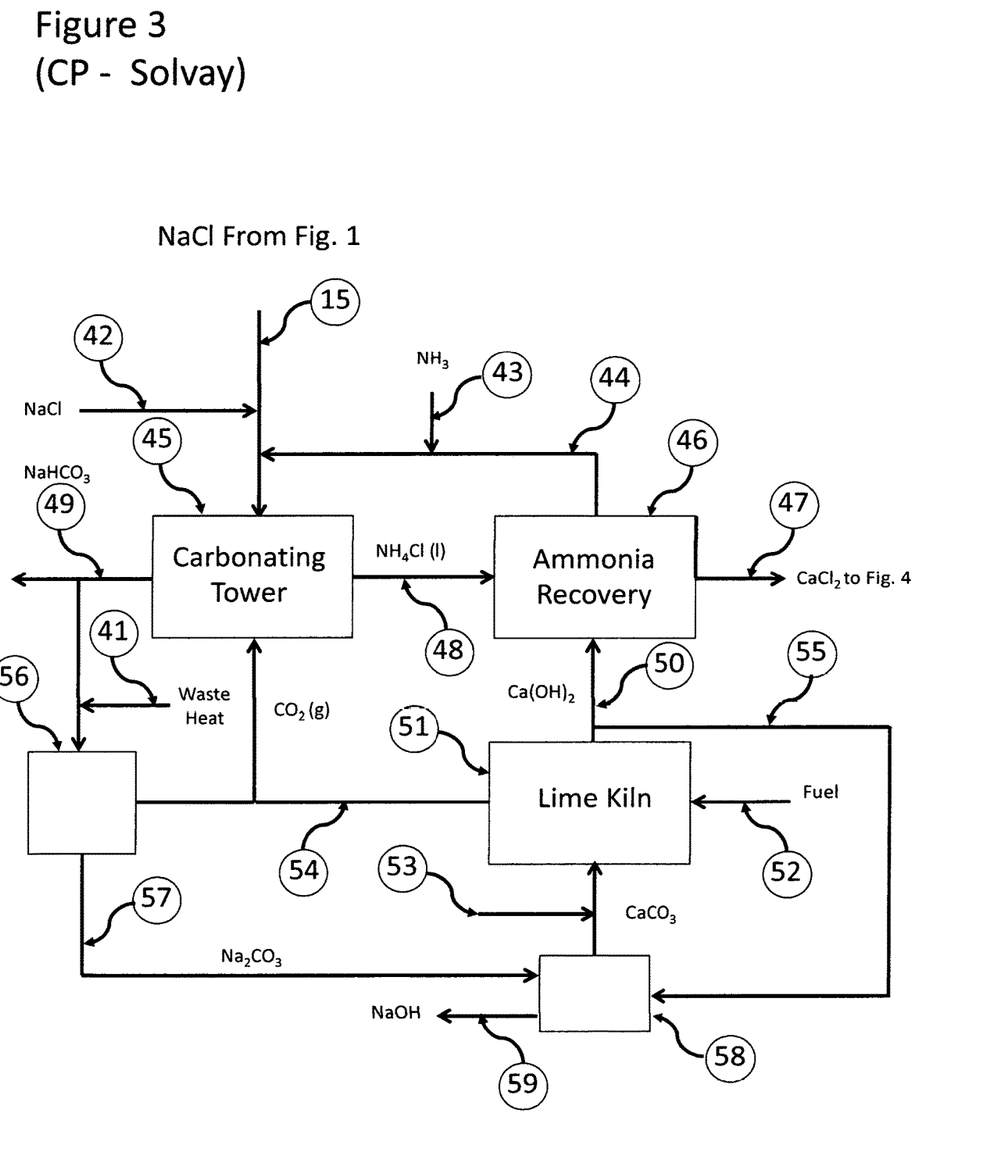
FIG. 3 is a schematic diagram of the Solvay version of the CP.

Solar energy, supplemented by waste heat (6) as needed, is next used to evaporate PW in evaporator (5) to concentrate the NaCl content of the PW to a level suitable for the CPs shown in FIGS. 2 and 3. As indicated at (16), microbubbles may again be used to enhance the evaporation process.

Figure 4:
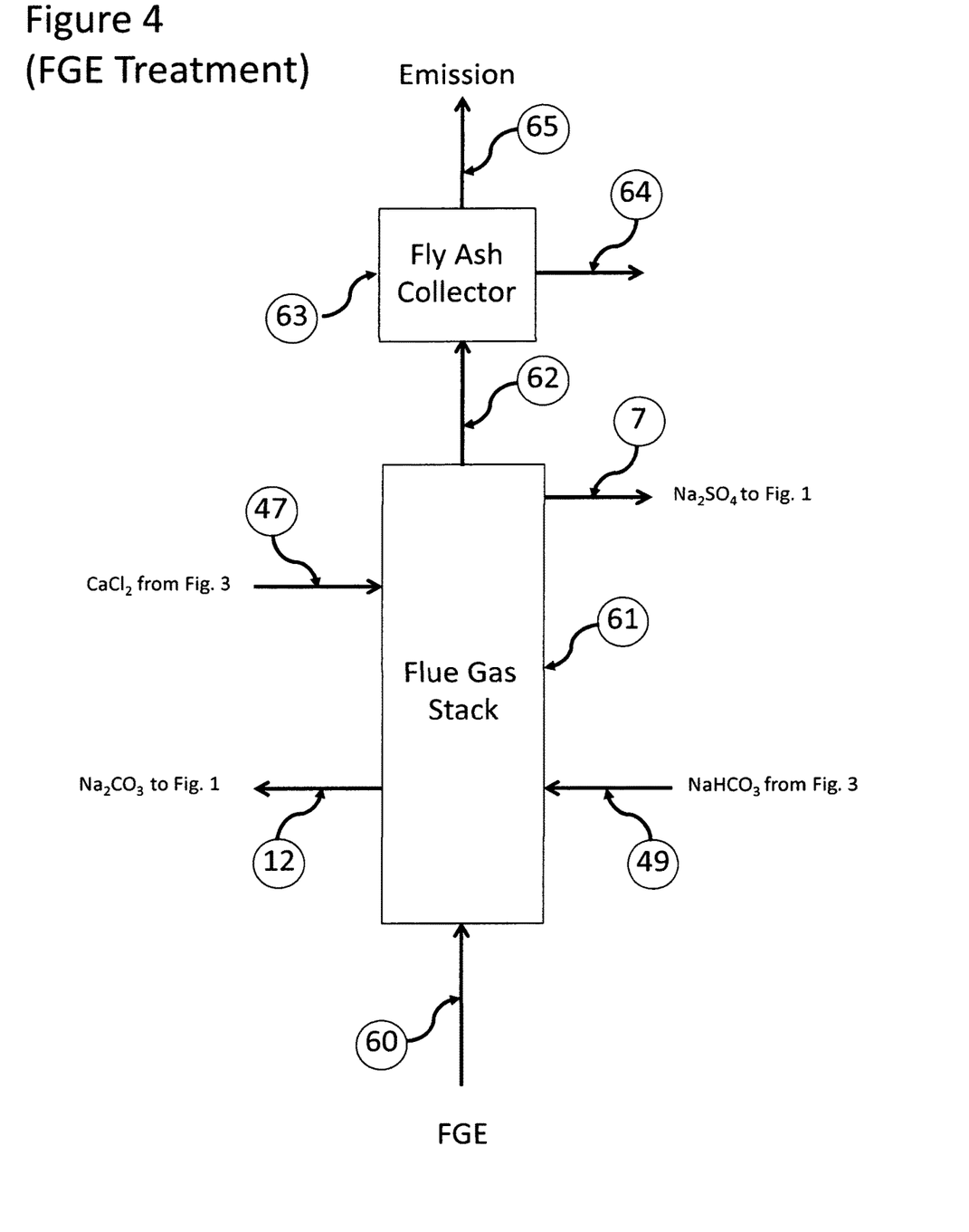
FIG. 4 is a schematic diagram of the FGE treatment process that uses chemicals from the CP and provides chemicals for the SSP in FIG. 1.

Sodium sulfate (7), preferably produced from the treatment of FGE in FIG. 4, is then added to the concentrated PW (8), to react with barium, strontium, and radium to produce insoluble sulfate salts (9) that are removed by a first clarifier (10) with the aid of magnetite (17).

Sodium carbonate (12), preferably also from the treatment of FGE in FIG. 4, is then added to the clarified PW (11), forming carbonate salts of calcium, iron, manganese and strontium that may be precipitated out in a second clarifier (13) with the aid of magnetite (17), as indicated at (14). The treated PW provided at (15) is now a highly concentrated brine solution containing mainly sodium chloride that is used in the CP of either of FIG. 2 or 3.

It is preferred that both clarifiers (10) and (13) use the magnetic ballast clarifying techniques disclosed in applicant's co pending application Ser. No. 14/612,635, but this is required for practice of the present invention.

FIG. 2 shows a detailed flow diagram of the Debang version of the CP, where the mainly pure NaCl solution (15) 50,000 ppm is further concentrated if needed by the addition of solid NaCl (21) to the treated PW (15) to achieve saturation. Then ammonia (22) is added to the NaCl solution to produce ammoniated brine that then flows into a carbonating tower (24) that uses carbon dioxide (25) to complete the CP reaction. The result is the production of sodium bicarbonate (26) and ammonium chloride (27) some of which may be sold, some of which can be used to remove mercury from FGE, as discussed below, while some can be recycled (23) back into the CP to add ammonia back into the process.

FIG. 3 is a detailed diagram of the Solvay version of the CP where a relatively clean solution of NaCl from the SSP shown in FIG. 1 (15) is further concentrated if needed by the addition of solid sodium chloride (42). This concentrated NaCl solution is combined with ammonia (44) recovered from the CP or by additional ammonia (43) added to produce an ammoniated brine solution that then flows into a carbonating tower (45) where carbon dioxide (54) is added to produce ammonium chloride (48) and sodium bicarbonate (49). The ammonium chloride solution (48) flows to an ammonia recovery system (46) and the sodium bicarbonate (49) is either sold or converted to sodium carbonate, with the resulting carbon dioxide reused in the CP. Calcium hydroxide (50) is used in the ammonia recovery system (46) where ammonia is formed (44) and reused in the CP process and calcium chloride is either sold or used in FIG. 4 to treat FGE. Sodium bicarbonate (49) is either sold or is treated with waste heat (41) in a reactor (56) to produce carbon dioxide for use back into the carbonating tower (45) and sodium carbonate (57) The sodium carbonate (57) reacts in a reactor (58) with calcium hydroxide (55) from a lime kiln (51) to produce limestone (53) and sodium hydroxide (59).

FIG. 4 is a schematic diagram of the FGE treatment process that uses chemicals from the CP and provides chemicals for the pretreatment of PW (SSP) shown in FIG. 1. FGE (60) flows into a flue gas stack (61) where various reactions take place. First sodium bicarbonate (49) is added to react with sulfur dioxide, carbon dioxide, and nitrogen oxides. Carbon dioxide is removed as sodium carbonate (12) and is used in the SSP (FIG. 1) to react with divalent cations to produce divalent carbonate salts. The sodium bicarbonate (49) also reacts with sulfur dioxide to produce sodium sulfate (7) that is used in the SSP (FIG. 1) to react with barium, strontium, and radium. Calcium chloride (47) from the CP (FIG. 3) is an oxidizer and when added to FGE (60) will convert elemental mercury contained in the FGE (60) into ionic mercury that will adsorb onto fly ash (64) and thereby removed by the fly ash collector system (63). Ammonium chloride could similarly be used to remove mercury from FGE. After treatment, clean emissions (65) result.

Figure 5:
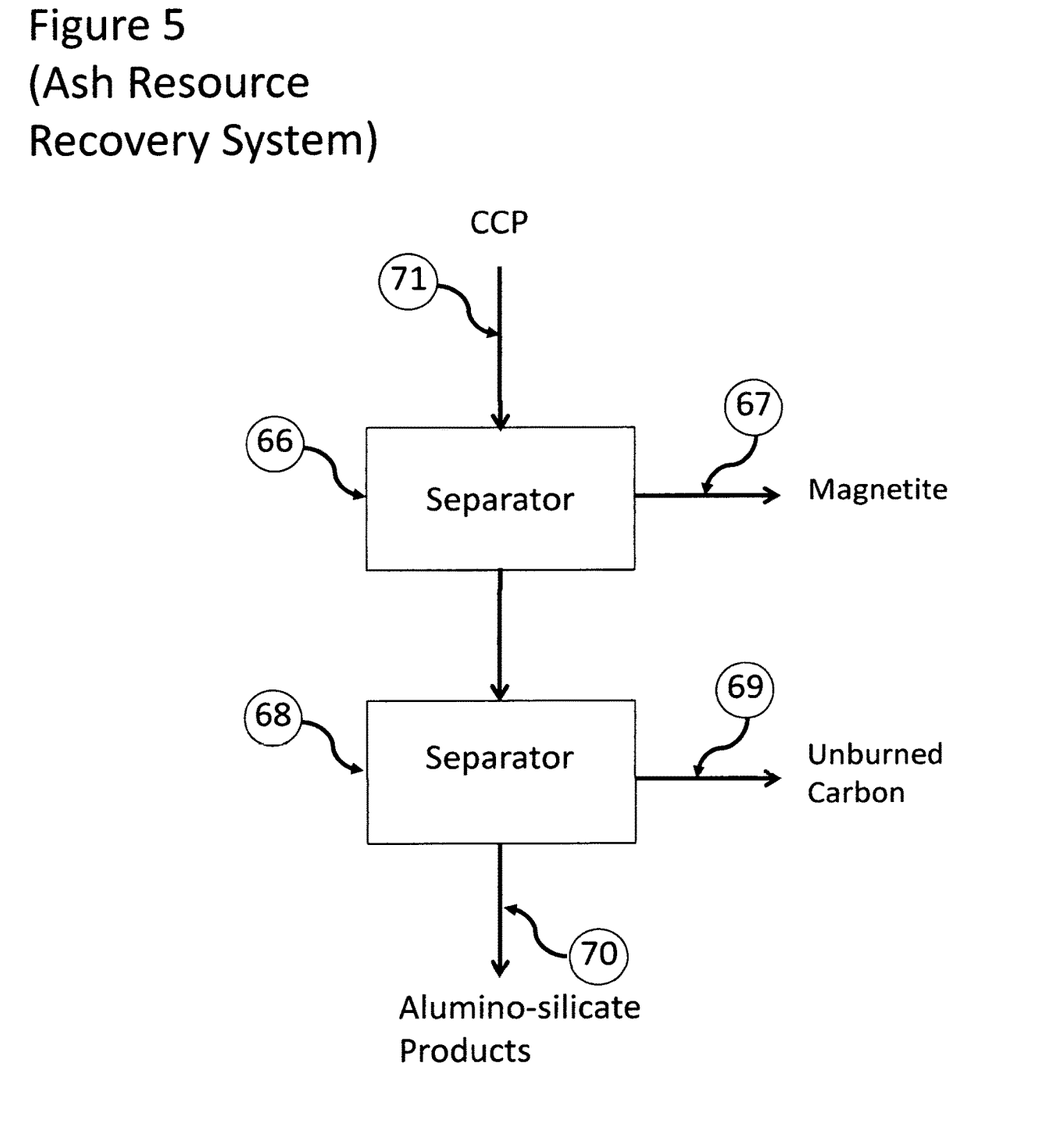
FIG. 5 is a schematic diagram of the recovery of valuable resources from CCP.

FIG. 5 shows the recovery of valuable resources from CCP. CCP (71) first flows into a separator (66) that separates magnetite (67) by magnetic, gravity, or electrostatic methods that are capable of separating magnetite either by its ferromagnetic properties, its density, or its electrical charge. Either dry or wet separation technologies can be used. Next CCP (71) flows into a second separator (68) where unburned carbon (69) is separated by either air (dry system), or froth flotation (wet system). Unburned carbon is less dense than the inorganic components of CCP (71) and therefore can be separated by air flotation. Because unburned carbon is also less dense than water, when mixed with frothing chemicals, principally an organic liquid like diesel fuel, it will float to the surface of the water. Finally remaining CCP (71) flows into a final collector (70) that collects alumino-silica products used for such applications as zeolite manufacture, cement additive, agriculture, adsorbents etc.

While this application has broadly described the inventive processes, not every detail has been described in detail. Those skilled in the art know the individual steps to be performed and equipment suitable for these processes.

What I claim as my invention is:

1. A method for producing sodium bicarbonate and ammonium chloride using water produced from oil or gas wells (Produced Water), or water flowing back (Flowback Water) after fracking oil or gas wells, as a source of brine, comprising the steps of:
   removing oil from Produced Water or Flowback Water in an oil/water separator;
   after oil removal, evaporating Produced Water or Flowback Water to increase its salinity, forming a high-salinity brine, adding solid sodium chloride if necessary;
   adding sodium sulfate to precipitate sulfate salts from said high-salinity brine in a first clarifier;
   adding sodium carbonate to precipitate carbonate salts and metals from said high-salinity brine in a second clarifier;
   adding ammonia and carbon dioxide to said high-salinity brine; and
   reacting sodium chloride in the high-salinity brine with the ammonia and carbon dioxide to yield sodium bicarbonate and ammonium chloride.

2. The method of claim 1, wherein the sodium chloride content of the high-salinity brine when reacted is approximately 150,000 ppm.

3. The method of claim 1, wherein the sodium bicarbonate and ammonium chloride are used to remove mercury, sulfur dioxide, nitrogen oxides, and carbon dioxide from fossil fuel combustion flue gas.

4. The method of claim 1, wherein the sodium bicarbonate is used to remove divalent elements from the high-salinity brine.

5. The method of claim 1, wherein sodium bicarbonate and sodium sulfate produced from the treatment of fossil fuel combustion gas are used to remove divalent cations from Produced Water and to provide carbon dioxide.

6. The method of claim 1, wherein chemicals selected from the group consisting of unburned carbon, zeolites, and magnetite are recovered from fly ash and used specifically to pretreat Produced Water as well as for removing other toxic organics from other wastewaters.

7. The method of claim 1, wherein the oil is removed from the Produced Water using a combination of microbubbles and coarse bubbles with a flocculating polymer to float oil out of the Produced Water.

8. The method of claim 1, wherein microbubbles and coarse bubbles are used in combination with solar energy and waste heat to increase the evaporation rate of Produced and Flowback Water.

* * * * *